US009711823B2

(12) United States Patent
Lee et al.

(10) Patent No.: US 9,711,823 B2
(45) Date of Patent: Jul. 18, 2017

(54) ELECTROLYTE HAVING EUTECTIC MIXTURE OF HETERO CYCLIC COMPOUND AND LITHIUM SALT AND ELECTROCHEMICAL DEVICE CONTAINING THE SAME

(71) Applicant: LG Chem, Ltd., Seoul (KR)

(72) Inventors: Byoung-Bae Lee, Chungcheongnam-do (KR); Jae-Seung Oh, Seoul (KR); Ji-Won Park, Daejeon (KR); Shin-Jung Choi, Jeonbuk (KR); Jae-Duk Park, Daejeon (KR); Dong-Su Kim, Daejeon (KR); Hyo-Jin Lee, Daejeon (KR)

(73) Assignee: LG Chem, Ltd. (KR)

( * ) Notice: Subject to any disclaimer, the term of this patent is extended or adjusted under 35 U.S.C. 154(b) by 383 days.

(21) Appl. No.: 14/268,638

(22) Filed: May 2, 2014

(65) Prior Publication Data

US 2014/0342239 A1 Nov. 20, 2014

Related U.S. Application Data

(63) Continuation of application No. 12/863,232, filed as application No. PCT/KR2008/007771 on Dec. 30, 2008, now Pat. No. 8,715,866.

(30) Foreign Application Priority Data

Jan. 18, 2008 (KR) ........................ 10-2008-0005650

(51) Int. Cl.
*H01M 10/052* (2010.01)
*H01G 11/56* (2013.01)
(Continued)

(52) U.S. Cl.
CPC ........ *H01M 10/0565* (2013.01); *H01G 11/56* (2013.01); *H01M 10/052* (2013.01);
(Continued)

(58) Field of Classification Search
CPC ......... H01M 10/0565; H01M 10/0566; H01M 10/0525; H01M 10/052
See application file for complete search history.

(56) References Cited

U.S. PATENT DOCUMENTS 6,120,696 A   9/2000 Armand et al.
6,472,100 B1  10/2002 Maruta
(Continued)

FOREIGN PATENT DOCUMENTS

CN   1428012 A   7/2003
CN   1838469 A   9/2006
(Continued)

OTHER PUBLICATIONS

International Search Report, PCT/KR2008/007771, dated Jul. 20, 2009.
(Continued)

*Primary Examiner* — Kenneth Douyette
(74) *Attorney, Agent, or Firm* — Lerner, David, Littenberg, Krumholz & Mentlik, LLP

(57) ABSTRACT

An electrolyte includes an eutectic mixture composed of (a) a hetero cyclic compound having a predetermined chemistry figure, and (b) an ionizable lithium salt. An electrochemical device having the electrolyte. The eutectic mixture included in the electrolyte exhibits inherent characteristics of an eutectic mixture such as excellent thermal stability and excellent chemical stability, thereby improving the problems such as evaporation, ignition and side reaction of an electrolyte caused by the usage of existing organic solvents.

18 Claims, 1 Drawing Sheet

(51) Int. Cl.
  *H01M 10/0565* (2010.01)
  *H01M 10/0566* (2010.01)
  *H01M 10/0525* (2010.01)

(52) U.S. Cl.
  CPC ... *H01M 10/0525* (2013.01); *H01M 10/0566* (2013.01); *H01M 2300/0085* (2013.01); *Y02E 60/13* (2013.01)

(56) References Cited

U.S. PATENT DOCUMENTS

| | | | |
|---|---|---|---|
| 2001/0023041 A1 | 9/2001 | Hayase et al. | |
| 2003/0165737 A1* | 9/2003 | Nakagawa | H01M 4/485 429/188 |
| 2004/0265587 A1 | 12/2004 | Koyanagi et al. | |
| 2005/0019670 A1 | 1/2005 | Amine et al. | |
| 2005/0042519 A1 | 2/2005 | Roh et al. | |
| 2005/0064294 A1 | 3/2005 | Lim et al. | |
| 2006/0121355 A1 | 6/2006 | Kolosnitsyn et al. | |
| 2007/0042266 A1 | 2/2007 | Oh et al. | |
| 2007/0099080 A1* | 5/2007 | Pickett, Jr. | H01M 4/38 429/188 |
| 2007/0099090 A1* | 5/2007 | Oh | H01M 10/0565 429/339 |
| 2011/0052999 A1 | 3/2011 | Lee et al. | |

FOREIGN PATENT DOCUMENTS

| | | |
|---|---|---|
| EP | 1317013 A1 | 6/2003 |
| JP | 3059963 | 3/1991 |
| JP | 2001148257 A | 5/2001 |
| JP | 2002-110225 A | 4/2002 |
| JP | 5538238 B2 | 7/2014 |
| KR | 20040061562 A | 7/2004 |
| KR | 20070021962 | 2/2007 |
| KR | 20070045975 A | 5/2007 |
| KR | 20070085575 A | 8/2007 |
| WO | 01/93363 A2 | 12/2001 |
| WO | 2005029632 A1 | 3/2005 |
| WO | 2007021151 A1 | 2/2007 |

OTHER PUBLICATIONS

Search Report from corresponding European Application No. 15152656.3, dated May 4, 2015.

* cited by examiner

ELECTROLYTE HAVING EUTECTIC MIXTURE OF HETERO CYCLIC COMPOUND AND LITHIUM SALT AND ELECTROCHEMICAL DEVICE CONTAINING THE SAME

CROSS-REFERENCE TO RELATED APPLICATIONS

The present application is a continuation of U.S. patent application Ser. No. 12/863,232, filed Oct. 13, 2010, which is a national phase entry under 35 U.S.C. §371 of International Application No. PCT/KR2008/007771, filed Dec. 30, 2008, published in English, which claims priority from Korean Patent Application No. 10-2008-0005650, filed Jan. 18, 2008. The disclosures of said applications are incorporated by reference herein.

TECHNICAL FIELD

The present invention relates to an electrolyte having an eutectic mixture and an electrochemical device containing the same.

BACKGROUND ART

Various kinds of electrolytes are used for electrochemical devices, frequently used recently, such as lithium secondary batteries, electrolytic condensers, electric double-layer capacitors, electrochromic display devices, and dye-sensitized solar cells that are currently studied in various ways for further usage, and the importance on electrolytes is increased day by day.

In recent, the most frequently used electrolytes are non-aqueous electrolytes obtained by dissolving ionizable salts such as lithium salt in organic solvents such as ethylene carbonate, propylene carbonate, dimethoxy ethane, γ-butyrolactone (GBL), N,N-dimethyl formamide, tetrahydrofurane and acetonitrile.

However, the organic solvents used for such a non-aqueous electrolyte exhibit easy leakage due to low viscosity and they may be vaporized due to very strong volatility. Also, these organic solvents exhibit strong flammability. Accordingly, an electrochemical device having such an organic solvent shows problems in durability and stability.

In order to solve this problem, there has been proposed a method of using an imidazolium-based or ammonium-based ionic liquid as an electrolyte of a lithium secondary battery. However, such an ionic liquid may be reduced at a higher voltage than lithium ions in an anode, or imidazolium or ammonium cations may be inserted into the anode together with lithium ion, which rather deteriorates the battery performance.

Meanwhile, Korean Patent Registration No. 10-751203 and Korean Laid-open Patent Publication No. 10-2007-85575 disclose eutectic mixtures of lithium and amide compound such as acetamide, urea, methylurea, caprolactam, valerolactam, trifluoroacetamide, carbamate and formamide, expressed as predetermined chemistry figures, as an electrolyte. Such eutectic mixtures exhibit high thermal and chemical stabilities as well as relatively wide electrochemical window, so they solve the problems such as evaporation or ignition of electrolyte caused by the usage of the existing organic solvents.

Accordingly, the development of various eutectic mixtures as electrolyte is accelerated.

DISCLOSURE

Technical Problem

Therefore, it is an object of the present invention to provide an electrolyte having a new eutectic mixture exhibiting high thermal and chemical stabilities, and an electrochemical device containing the same.

Technical Solution

In one aspect of the present invention, there is provided an electrolyte, which includes an eutectic mixture composed of: (a) a hetero cyclic compound expressed by the following chemistry FIG. 1; and (b) an ionizable lithium salt, <Chemical Formula 1>

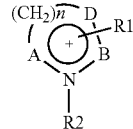

where R1 is hydrogen or any one selected from the group consisting of alkyl group, alkylamine group, alkenyl group, aryl group and alaryl group, which has 1 to 10 carbons, where R2 is hydrogen or an alkyl group having 1 to 10 carbons, where A, B and D are independently carbon or nitrogen, and where n is an integer of 1 to 5.

In the electrolyte of the present invention, the hetero cyclic compound is preferably any one selected from the group consisting of imidazole, pyrazole, triazole, pyrimidine, 4-isopropylimidazole, 4-methylimidazole, ethoxypyridine and N-ethylimidazole.

Also, in the electrolyte of the present invention, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, for examples.

In the electrolyte of the present invention, the eutectic mixture preferably contains the hetero cyclic compound and the lithium salt at a mole ratio of 1~8:1.

Also, in the electrolyte of the present invention, in case the electrolyte is a liquid electrolyte, the eutectic mixture may be included with the content of 50 to 100 weight %, based on the entire weight of the electrolyte.

The electrolyte of the present invention may be usefully applied to electrochemical devices such as lithium secondary batteries.

Advantageous Effect

The new eutectic mixture included in an electrolyte according to the present invention exhibits inherent characteristics of an eutectic mixture such as excellent thermal stability and excellent chemical stability, thereby improving the problems such as evaporation, ignition and side reaction of an electrolyte caused by the usage of existing organic solvents.

BEST MODE

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
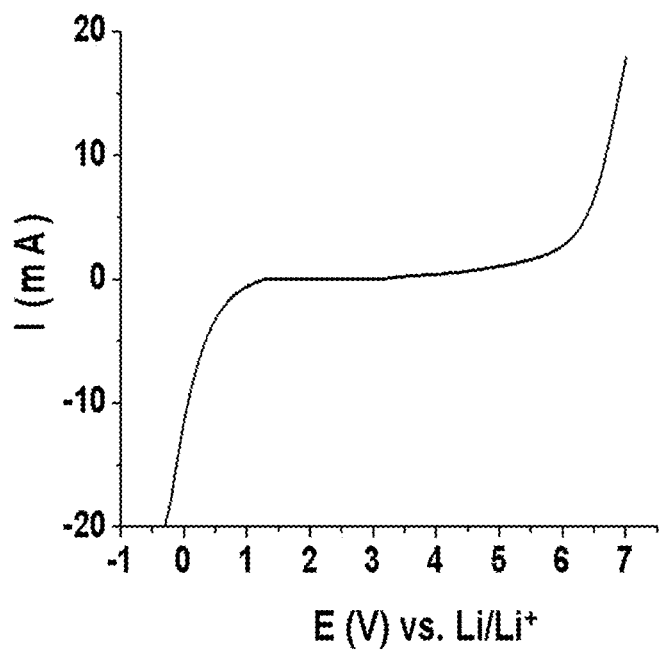
FIG. 1 is a graph showing an electrochemical window of an imidazole-LiTFSI eutectic mixture according to an example 1 of the present invention.

An electrolyte according to the present invention includes an eutectic mixture composed of (a) a hetero cyclic compound expressed by the following chemistry FIG. 1; and (b) an ionizable lithium salt.

Chemical Formula 1 where R1 is hydrogen or any one selected from the group consisting of alkyl group, alkylamine group, alkenyl group, aryl group and alaryl group, which has 1 to 10 carbons, where R2 is hydrogen or an alkyl group having 1 to 10 carbons, where A, B and D are independently carbon or nitrogen, and where n is an integer of 1 to 5.

The inventors formed an eutectic mixture using the hetero cyclic compound, mentioned above, together with a lithium salt. This eutectic mixture exhibits high thermal and chemical stabilities, which are inherent to eutectic mixtures such as an eutectic mixture of lithium salt and amide-based compound like methyl carbamate.

In the electrolyte of the present invention, the hetero cyclic compound of the eutectic mixture, expressed by the chemistry FIG. 1, is preferably any one selected from the group consisting of imidazole, pyrazole, triazole, pyrimidine, 4-isopropylimidazole, 4-methyl imidazole, ethoxypyridine and N-ethylimidazole. In particular, if imidazole, pyrazole or ethoxypyridine is used, a reduction potential of an electrochemical window is lowered, so the electrolyte may be more usefully utilized for electrochemical devices employing various anode materials.

In addition, in the electrolyte of the present invention, the lithium salt that configures the eutectic mixture together with the hetero cyclic compound is an ionizable lithium salt, which may be expressed as $Li^+X^-$. This lithium salt may have an anion such as $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, though not limited thereto.

In the electrolyte of the present invention, the eutectic mixture has a melt temperature that may be varied depending on A, B, D, R1 and R2 of the chemistry FIG. 1, but preferably the eutectic mixture exists in a liquid state at a normal temperature (25° C.). Also, the eutectic mixture preferably has a viscosity of 2000 cP or less, though not limited thereto.

In the electrolyte of the present invention, the eutectic mixture may be prepared in a common way well known in the art. For example, the eutectic mixture may be obtained by mixing the hetero cyclic compound with a lithium salt at a normal temperature and reacting and then purifying the mixture at a suitable temperature not higher than 70° C. At this time, in the prepared eutectic mixture, the hetero cyclic compound and the lithium salt are preferably included at a mole ratio of 1~8:1, more preferably 1~6:1.

The electrolyte of the present invention includes the eutectic mixture having lithium ions in itself, so lithium ion may not be separately added thereto though the electrolyte is applied to a lithium secondary battery. However, the electrolyte of the present invention may further include a salt such as lithium salt at a concentration of 0 to 1 M/L, for example. In case lithium salt is further included in the electrolyte, it is preferred to use a lithium salt having the same anion as that of the lithium salt included in the eutectic mixture in order to improve solubility in the electrolyte.

In addition, it would be apparent to those having ordinary skill in the art that various kinds of additives or organic solvents may be further included in the electrolyte of the present invention if they do not deteriorate the inherent effects of the present invention.

The electrolyte of the present invention may use all kinds of electrolytes regardless of their forms, for example liquid electrolyte and solid or gel-type polymer electrolyte made of polymer itself. In case a liquid electrolyte is applied as the electrolyte of the present invention, the eutectic mixture may be used in single or in combination with salt, organic solvent, additive and so on. The content of the eutectic mixture in the electrolyte is preferably 50 to 100 weight %, based on the entire weight of the electrolyte.

Meanwhile, in case the electrolyte of the present invention is a polymer electrolyte, the electrolyte is a gel-type polymer electrolyte formed by polymerization of the eutectic compound and a precursor solution containing a monomer that may form a polymer by polymerization reaction, or the electrolyte is prepared as a polymer electrolyte where the eutectic mixture is impregnated in a solid or gel-type polymer.

① First, the gel-type polymer electrolyte prepared by polymerization of a precursor solution is explained.

The gel-type polymer electrolyte according to one aspect of the present invention may be formed by polymerizing (i) the eutectic mixture expressed by the above chemistry FIG. 1; and (ii) a precursor solution containing a monomer that may form a polymer by polymerization.

The monomer may use all kinds of monomers that may form a gel polymer together with the eutectic mixture while polymerization reaction progresses, and it may be a vinyl monomer, but not limited thereto. The vinyl monomer allows very easy polymerization when it is mixed with the eutectic mixture to form a gel polymer The vinyl monomer may be acrylonitrile, methylmethacrylate, methylacrylate, methacrylonitrile, methylstyrene, vinylester, vinyl chloride, vinylidene chloride, acrylamide, tetrafluoroethylene, vinylacetate, methylvinylketone, ethylene, styrene, paramethoxystyrene and paracyanostyrene, or their mixtures.

The precursor solution may additionally include common polymerization initiators or photo initiators. The initiator is decomposed by heat or UV rays to form radicals, and then forms a gel polymer electrolyte by reacting with the monomer by free radical polymerization. In addition, the monomer may also be polymerized without using an initiator. Generally, the free radical polymerization goes through an initiation reaction by which temporary molecules or active sites with strong reactivity are formed, a propagation reaction by which a monomer is added to an activation chain terminal to form an active site at the end of the chain, a chain transfer reaction by which the active sites are transferred to other molecules, and a termination reaction by which the activation chain center is destroyed.

Allowable thermal polymerization initiators may be organic peroxides or hydroperoxides such as benzoyl peroxide, acetyl peroxide, dilauryl peroxide, di-tert-butyl peroxide, cumyl hydroperoxide and hydrogen peroxide; azo compounds such as 2,2-azobis(2-cyanobutane), 2,2-azobis(methylbutyronitrile), AIBN (azobis(iso-butyronitrile) and AMVN (azobisdimethyl-valeronitrile); organic metals such as alkylated silvers; and so on, but not limitedly. Also, the photo initiator that forms radicals by light such as UV rays may be chloroacetophenone, diethoxy acetophenone (DEAP), 1-phenyl-2-hydroxy-2-methyl propaneone (HMPP), 1-hydroxy cyclohexyl phenyl ketone, α-amino acetophenone, benzoin ether, benzyl dimethyl ketal, benzophenone, thioxanthone, 2-ethylanthraquinone (2-ETAQ) and so on.

In addition to the above components, the precursor solution of the gel polymer electrolyte employed in the present invention may selectively contain other additives well known in the art.

The above precursor solution is used to form a gel polymer electrolyte in a common way well known in the art. At this time, the gel polymer electrolyte is preferably prepared by means of in-situ polymerization reaction in an electrochemical device. The in-situ polymerization reaction may be conducted using heat or UV irradiation. A content ratio of the eutectic mixture and the monomer in the precursor solution is preferably controlled to 0.5~0.95: 0.05~0.5. The degree of polymerization of the gel polymer may be adjusted depending on reaction factors such as polymerization time, polymerization temperature and amount of irradiated light, so the degree of polymerization is controlled such that polymer is not over-polymerized to shrink its volume without any leakage of electrolyte.

② As another method for preparing a polymer electrolyte including an eutectic mixture according to the present invention, it is possible to inject an eutectic mixture to a previously prepared solid or gel polymer such that the eutectic mixture is impregnated in the polymer.

Available polymers include polymethylmethacrylate, polyvinylidene difluoride, polyvinyl chloride, polyethylene oxide and polyhydroxyethylmethacrylate, which may be used in single or in mixture, but not limitedly. This method may be simplified using the above in-situ polymerization.

③ As another method for preparing a polymer electrolyte including an eutectic mixture according to the present invention, it is also possible to dissolve a polymer and an eutectic mixture in a solvent and then eliminating the solvent to form a polymer electrolyte. At this time, the eutectic mixture is in a state of being contained in a polymer matrix.

Available solvents are not specially limited, but the solvent may be toluene, acetone, acetonitrile, THF and so on, but not limitedly. Also, the solvent may be eliminated in various ways such as heating, without special limitations.

The electrolyte including an eutectic mixture according to the present invention may be applied to common electrochemical devices well known in the art, which need various electrochemical characteristics according to their usages.

The electrochemical devices may be all kinds of primary batteries, secondary batteries, fuel cells, solar cells, electrochromic devices, electrolyte condensers, and capacitors, and they may be more specifically lithium secondary batteries, electric double-layer capacitors, dye-sensitized solar cells and electrochromic devices.

Mode for Invention

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Example 1

Composing of Imidazole-LiTFSI Eutectic Mixture 14.2 g of purified imidazole and 20 g of LiTFSI were put into a round bottom flask and slowly stirred for 2 hours under a nitrogen circumstance of 40° C., thereby obtaining 34 g of imidazole-LiTFSI eutectic mixture.

Example 2

Composing of 1,2,4-triazole-LiTFSI Eutectic Mixture 3.6 g of purified 1,2,4-triazole and 5 g of LiTFSI were put into a round bottom flask and slowly stirred for 4 hours under a nitrogen circumstance of 70° C., thereby obtaining 8.5 g of targeted eutectic mixture.

Example 3

Composing of Pyrazole-LiTFSI Eutectic Mixture 2.13 g of purified pyrazole and 3 g of LiTFSI were put into a round bottom flask and slowly stirred for 5 hours under a nitrogen circumstance of 30° C., thereby obtaining 5.1 g of pyrazole-LiTFSI eutectic mixture.

Example 4

Composing of Pyrazole-$LiSO_3CF_3$ Eutectic Mixture 2.61 g of purified pyrazole and 2 g of $LiSO_3CF_3$ were put into a round bottom flask and slowly stirred for 50 minutes under a nitrogen circumstance of 50° C., thereby obtaining 4.6 g of pyrazole-$LiSO_3CF_3$ eutectic mixture.

Example 5

Composing of Pyrazole-$LiClO_4$ Eutectic Mixture 3.85 g of purified pyrazole and 2 g of $LiClO_4$ were put into a round bottom flask and slowly stirred for 5 hours at a normal temperature under a nitrogen circumstance of 40° C., thereby obtaining 5.8 g of pyrazole-$LiClO_4$ eutectic mixture.

Example 6

Composing of Imidazole-LiBETI Eutectic Mixture 5.3 g of purified imidazole and 10 g of LiBETI were put into a round bottom flask and slowly stirred for 50 minutes under a nitrogen circumstance of 50° C., thereby obtaining 15.2 g of imidazole-LiBETI eutectic mixture.

Example 7

Composing of Pyrimidine-LiTFSI Eutectic Mixture 10 g of purified pyrimidine and 11.949 of LiTFSI were put into a round bottom flask and slowly stirred for 1 hour under a nitrogen circumstance of 40° C., thereby obtaining 21.5 g of pyrimidine-LiTFSI eutectic mixture.

Example 8

Composing of 2-ethoxypyridine-LiTFSI Eutectic Mixture 10 g of purified 2-ethoxypyridine and 7.77 g of LiTFSI were put into a round bottom flask and slowly stirred for 50 minutes under a nitrogen circumstance of 50° C., thereby obtaining 17.5 g of 2-ethoxypyridine-LiTFSI eutectic mixture.

Preparation Example 1

Gel Polymer Electrolyte by Thermal Polymerization of Imidazole-LiTFSI Eutectic Mixture The imidazole-LiTFSI eutectic mixture composed in the example 1, HEMA (2-hydroxyethylmethacrylate) monomer and AMVN (azobisdimethyl-valeronitrile) as a thermal polymerization initiator were mixed at a weight ratio of 8:2:0.01 and polymerized for 1 hour at 55° C., thereby forming a gel polymer electrolyte.

Preparation Example 2

Gel Polymer Electrolyte by UV Polymerization of Imidazole-LiTFSI Eutectic Mixture A precursor solution in which the imidazole-LiTFSI eutectic mixture prepared in the example 1, TAEI (tris[2-(acryloyloxy) ethyl] isocyanurate) as a crosslinking agent, MPEGM (methoxy poly(ethylene glycol) methacrylate) as a monomer and Irgacure-184 (Ciba) as a UV polymerization initiator were mixed at a weight % ratio of 50:0.5:50:10 was prepared, and then UV was irradiated thereto to polymerize the precursor solution, thereby forming a gel polymer electrolyte.

Comparative Example 1

Composing of Acetamide-LiTFSI Eutectic Mixture 5 g of purified acetamide and 6 g of LiTFSI were put into a round bottom flask and slowly stirred for 12 hours at a normal temperature under a nitrogen circumstance, and then moisture was removed therefrom in a vacuum oven for 3 days, thereby obtaining 11 g of acetamide-LiTFSI eutectic mixture.

In order to evaluate properties of the eutectic mixtures according to the examples and the comparative example, the following test was executed.

As test pieces, the eutectic mixtures prepared in the examples 1 to 8 and the comparative example 1 were used, and at this time a ratio of the used eutectic mixture was 3:1 for amide compound and salt. Viscosity was measured using a RS150 viscometer, and conductivity was measured using Inolab 740. The test results are shown in the following table 1.

TABLE 1

| | Hetero cyclic compound | Salt | Viscosity (cP) | Conductivity (mS/cm) | Potential window (V) |
|---|---|---|---|---|---|
| Example 1 | imidazole | LiTFSI | 410 | 0.38 | 0.5~6.3 |
| Example 2 | 1,2,4-triazole | LiTFSI | 1000 | 0.02 | 0.8~5.4 |
| Example 3 | pyrazole | LiTFSI | 147 | 0.70 | 0.6~5.6 |
| Example 4 | pyrazole | LiSO$_3$CF$_3$ | 319 | 0.34 | 0.7~5.5 |
| Example 5 | pyrazole | LiClO$_4$ | 303 | 0.32 | 0.8~5.7 |
| Example 6 | imidazole | LiBETI | 806 | 0.21 | 0.8~5.2 |
| Example 7 | pyrimidine | LiTFSI | 8.58 | 6.27 | 1.4~5.1 |
| Example 8 | 2-ethoxypyridine | LiTFSI | 39.2 | 0.52 | 0.6~4.4 |
| Comparative example 1 | acetamide | LiTFSI | 100 | 1.07 | 0.7~5.2 |

Figure 2:
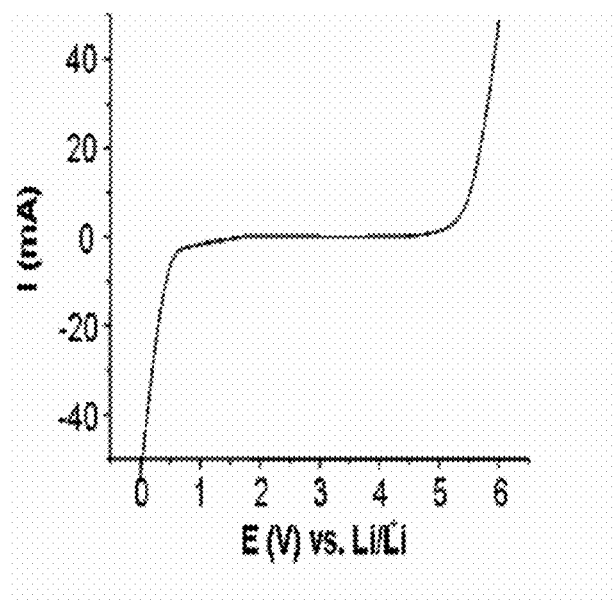
FIG. 2 is a graph showing an electrochemical window of an acetamide-LiTFSI eutectic mixture according to a comparative example 1.

Seeing the test results of the table 1, it would be understood that the eutectic mixtures according to the examples of the present invention exhibit useful physical and chemical properties. In particular, it would be found that the eutectic mixtures of the examples 1, 3 and 8 exhibit a reduction potential of an electrochemical window, which is meaningfully lower than that of the conventional eutectic mixture. FIGS. 1 and 2 are graphs illustrating the electrochemical windows of the eutectic mixtures according to the example 1 and the comparative example 1.

The invention claimed is:

1. An electrolyte, comprising an eutectic mixture comprising:
  (a) a hetero cyclic compound selected from the group consisting of imidazole, pyrazole, triazole, pyrimidine, 4-isopropylimidazole, 4-methylimidazole, ethoxypyridine and N-ethylimidazole; and
  (b) an ionizable lithium salt,
wherein the eutectic mixture exists in a liquid state at 25° C.

2. The electrolyte according to claim 1, wherein an anion of the lithium salt is any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

3. The electrolyte according to claim 1, wherein the eutectic mixture contains the hetero cyclic compound and the lithium salt at a mole ratio of 1~8:1.

4. The electrolyte according to claim 1, wherein the eutectic mixture has a viscosity of 2000 cP or less.

5. The electrolyte according to claim 1, wherein the electrolyte further comprises a lithium salt.

6. The electrolyte according to claim 5, wherein an anion of the lithium salt is identical to an anion of the ionizable lithium salt in the eutectic mixture.

7. The electrolyte according to claim 5, wherein a concentration of the lithium salt is more than 0 to 1 M/L or less.

8. The electrolyte according to claim 1, wherein the electrolyte is a liquid electrolyte, and the amount of the eutectic mixture in the electrolyte is 50 to 100 weight %, based on the total weight of the electrolyte.

9. The electrolyte according to claim 1, wherein the electrolyte is a polymer electrolyte.

10. The electrolyte according to claim 9, wherein the polymer electrolyte is a gel-type polymer electrolyte formed by polymerization of (i) the eutectic compound, and (ii) a precursor solution containing a monomer that forms a polymer by polymerization reaction.

11. The electrolyte according to claim 10, wherein the monomer is a vinyl monomer.

12. The electrolyte according to claim 11, wherein the vinyl monomer is any one selected from the group consisting of acrylonitrile, methylmethacrylate, methylacrylate, methacrylonitrile, methylstyrene, vinylester, vinyl chloride, vinylidene chloride, acrylamide, tetrafluoroethylene, vinylacetate, methylvinylketone, ethylene, styrene, paramethoxystyrene and paracyanostyrene, or their mixtures.

13. The electrolyte according to claim 10, wherein a content ratio of the eutectic mixture and the monomer in the precursor solution is 0.5~0.95:0.05~0.5.

14. The electrolyte according to claim 10, wherein the gel-type polymer electrolyte is obtained by in-situ polymerization in an electrochemical device.

15. The electrolyte according to claim 9, wherein the polymer electrolyte is obtained by impregnating the eutectic mixture in a polymer.

16. The electrolyte according to claim 15, wherein the polymer is polymethylmethacrylate, polyvinylidene difluoride, polyvinyl chloride, polyethylene oxide, polyhydroxyethylmethacrylate, or a mixture thereof.

17. An electrochemical device, comprising a cathode, an anode and the electrolyte of claim 1.

18. The electrochemical device according to claim 17, wherein the electrochemical device is a lithium secondary battery.

* * * * *